Patented Apr. 13, 1954

2,675,388

UNITED STATES PATENT OFFICE 2,675,388

WATER SOLUBLE SULFUR CONTAINING ORGANIC MERCURY COMPOUNDS HAVING DIURETIC PROPERTIES AND PROCESS FOR PREPARING SAME

Robert A. Lehman, New York, N. Y., assignor, by mesne assignments, to American Home Products Corporation, New York, N. Y., a corporation of Delaware No Drawing. Application November 23, 1951, Serial No. 257,972

14 Claims. (Cl. 260—270)

The present invention relates to water-soluble sulfur-containing organic mercury compounds having diuretic properties, and to a process of preparing the same.

This application is a continuation-in-part of my copending application Serial No. 70,381, filed January 11, 1949, now Patent No. 2,576,349, dated November 27, 1951.

The parent application relates to novel mercury-containing pharmaceuticals having excellent diuretic properties and being free of the toxic effect on the heart which is a common disadvantage of prior art mercurial diuretics. They are characterized by the formula:

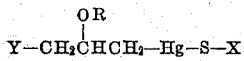

wherein Y is a residue of a water-soluble organic compound with a molecular weight below 1000, R is a hydrogen atom or a lower alkyl radical, and X is a residue of an organic sulfhydryl compound with a molecular weight below 1000 which is attached to the rest of the molecule through linkage of the sulfhydryl sulfur atom with the mercury atom.

The present application also defines a series of sulfur-containing mercurial diuretics, characterized by the formula:

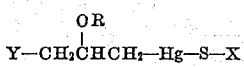

wherein R is either a hydrogen atom or a lower alkyl radical, preferably containing not more than six carbon atoms, Y is a residue of a water-soluble organic compound with a molecular weight below 1000, but wherein X is a residue of an inorganic sulfur compound. These compounds are formed by the reaction of any mercury compound characterized by the group:

with any suitable inorganic sulfur compound, wherein the stable —Hg—S— link is formed.

More particularly the invention relates to sulfur-containing mercurial diuretics, including the group:

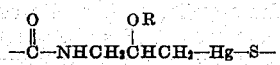

where R is a substituent selected from the group consisting of hydrogen and an alkyl radical, preferably containing not more than six carbon atoms, and where such groups as

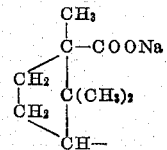

are attached to the carbon atom of the —CON— group. The —CON— group may be present as a side chain or as part of a ring structure.

The X and Y groups may be selected from an extremely wide range of compounds without adversely affecting the diuretic properties and freedom from cardiac toxicity which are among the outstanding characteristics of the new sulfur-containing organic mercury compounds of the present invention. The characteristic of freedom from cardiac toxicity appears to be due to the attachment of the second valence bond of the mercury atom to the X group through the relatively stable mercury to sulfur bond which does not at the same time bind the mercury so securely as to interfere with the diuretic action. The only other limiting factors as to the nature of the X and Y groups that appear to require consideration are the molecular sizes of these moieties. These should not be so large as to unduly reduce the solubility of the compound or confer upon it colloidal properties. Compounds having molecular weights not exceeding 1,000 will, as a general rule, have satisfactory properties. Organic groupings which in themselves are associated with extraneous pharmacological actions will ordinarily be avoided in producing mercurial diuretics, but it may be observed in passing that the diuretic potency of the compounds of the present invention, as well as of the prior mercurial diuretics for that matter, is of such high order that the doses which are used by the medical profession are universally within the range 0.0007–0.0014 gm. of mercury per kgm. of body weight. Consequently, the introduction of such a grouping into the molecule would generally imply such a small dose level as to be without significance. Furthermore, the attachment of a mercurial diuretic side chain as a substituent on another drug would, in the great majority of cases, destroy its activity because most drugs, unlike the mercurials, depend for their action on the configuration of the molecule as a whole.

The sulfur-containing mercurial diuretics of the present invention are prepared by adding the desired inorganic sulfur compound in molar equivalent amounts to an aqueous solution of the mercury compound which has been purified by the usual processes known to those skilled in the art.

The following reaction occurs:

(1) $-HgOH + HS- \rightarrow -Hg-S- + H_2O$ or, in case the sodium salt is employed, the reaction is, (2) $-HgOH + NaS- \rightarrow -Hg-S- + NaOH$ Where the alkali metal salt, such as NaS— or KS—, is employed in the reaction, the liberated sodium hydroxide or potassium hydroxide must be neutralized before the solution is used in therapeutics.

Any suitable inorganic sulfur compound can be utilized in the preparation of these compounds, in which the group —SH is present, such as, sodium, potassium or ammonium thiosulfate etc. Generally speaking, any sulfur compound is suitable for use herein, wherein the following typical reaction occurs:

(3) $-HgOH + QS- \rightarrow -Hg-S- + QOH$ where Q is usually hydrogen, sodium or potassium and may be ammonium, alkyl ammonium, an alkaline earth metal or any metal forming a water soluble salt. Pure sulfur compounds are preferable and commercially available products are sometimes sufficiently pure.

Any suitable mercury compound can be used in the present invention which includes the following structure:

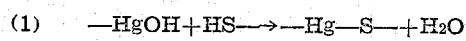

and is frequently the ammonium, alkali or alkaline earth metal salt of a carboxylic or sulfonic acid. The sodium hydroxide liberated in reaction (2) may, if desired, be employed in neutralizing this carboxylic or sulfonic acid group as follows:

(4)
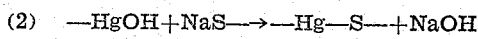

where Y, R and X have the definitions heretofore given them.

Suitable mercury reactants are cyclo paraffins such as N(gamma-hydroxymercuri-beta-methoxypropyl)-d-alpha-camphoramic acid and the alkali salts thereof,

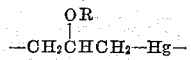

benzene derivatives such as N(gamma-hydroxymercuri-beta-methoxypropyl) carbamyl phenoxy-acetic acid and the alkali salts thereof,

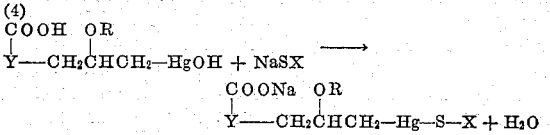

2-carboxy-2'(N - gamma - hydroxymercuri-beta- methoxypropyl) carbamyl-diphenic acid and the alkali salts thereof,

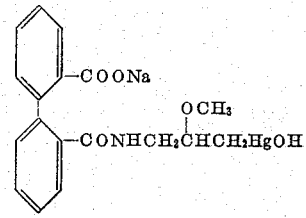

ortho - sulfo - N(gamma-hydroxymercuri - beta - methoxypropyl) benzamide and the alkali metal salts thereof,

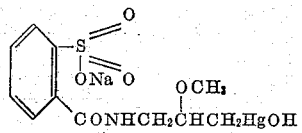

four carbon acyclic compounds such as N(gamma-hydroxymercuri-beta-methoxypropyl), N¹-succinyl urea and the alkali salts thereof,

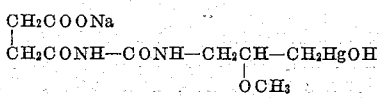

nitrogen heterocycles such as 3 carboxy-2-N-(gamma-hydroxymercuri-beta-hydroxy-propyl) carbamyl pyridine and the alkali salts thereof,

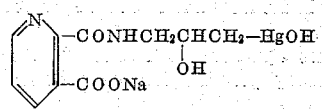

sulfur heterocycles such as 2 carboxy-5-(N-gamma-hydroxymercuri - beta - methoxypropyl) carbamyl-tetrahydrothiophene and the alkali salts thereof,

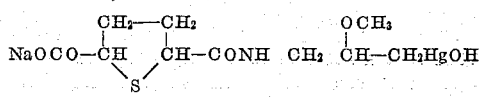

oxygen heterocycles such as 2 carboxy-5-(N-gamma - hydroxymercuri - beta methoxypropyl) carbamyl-tetrahydrofurane and the alkali salts thereof,

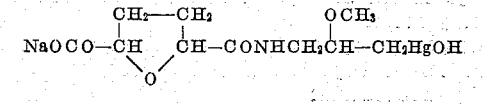

etc.

It is to be understood that the Y group of the new sulfur-containing organic mercury compounds of the present invention may consist of any of the following residues: straight and branched chain hydrocarbons, both saturated and unsaturated, and their simple substitution products; carbocycles, and nitrogen oxygen and sulfur heterocycles of not over four rings, both saturated and unsaturated, and their simple substitution products. By substitution products is implied such groups as —OH, —NH₂, —CO, —CN, —NO₂, —CHO, —OR, —PO₄, etc., commonly found in organic compounds. It should be further understood that Y may give rise to water solubility without the presence of a specific solubilizing group, as when it is derived from a carbohydrate residue or the like. More specifically, Y may be a monovalent group selected from members of the acyclic, carbocyclic and heterocyclic series that consist of or bear one or more of the following groups: polyhydroxy alkyl or aryl, glycosido, carbamido and its cyclic derivatives, carbalkoxyamino, guanido, guanyl, amino and their salts.

The following experiment was carried out to illustrate the use of a typical inorganic compound containing the —SH group for the purposes of the invention:

To 20 cc. of a 0.1 molar solution of the sodium salt of N(gamma-hydroxymercuri-beta-methoxypropyl) - d - alpha camphoramic acid, was added 0.316 gram (one mol equivalent) of anhydrous sodium thiosulfate. The pH of the solution which was initially 9.0, immediately rose to 10.6. The liberated sodium hydroxide was then titrated with tenth-normal hydrochloric acid, using the glass electrode to determine the pH after the addition of each increment of acid. As the acid was added the pH gradually fell. After 19.9 cc., the pH was 9.1; when 20.2 cc. had been added the pH dropped to 7.4. The appearance of this sharp inflection in the titration curve after the addition of approximately 20 cc. of acid clearly indicates that the reaction of the sodium thiosulfate with the mercury compound goes to completion as follows:

(5) 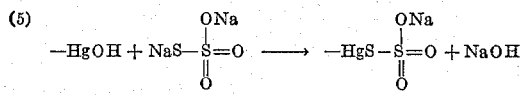

and that the divalent sulfur atom in sodium thiosulfate is, in fact, in the form —SNa rather than =S. This experiment also indicates that an exact mol equivalent of sodium hydroxide is liberated in this reaction.

The following example illustrates the preparation of a mercurial diuretic comprehended by the invention but is not to be construed as limiting the scope thereof:

*Example*

Purified N(gamma - hydroxy - mercuri - beta-methoxy-propyl) - d - alpha-camphoramic acid (4.88 grams) was added to 300 cc. of absolute methyl alcohol in which had been suspended 1.58 grams (one mol equivalent) of pure anhydrous sodium thiosulfate, and stirred vigorously until all was dissolved. The resulting solution was poured into a small volume of anhydrous di-ethyl ether and more ether added until a yellow precipitate formed. The addition of ether was continued, a small amount at a time, until the precipitate forming was white instead of yellow. This preliminary precipitate (which represents only a minor proportion of the reactants) was then filtered off and discarded, and the remaining solution which was clear and colorless, was thrown into a large volume of ether. The white precipitate thus thrown down was filtered off and dried at 40° C. under reduced pressure. The product is an amorphorus, white hygroscopic powder, which decomposes at 134–136° C. (uncorr.), and which was found on analysis to have a mercury content of 29.1 per cent.

This product formed by the reaction of sodium thiosulfate with N(gamma - hydroxy - mercuri-beta - methoxypropyl)-d-alpha - camphoramic acid has the following structure:

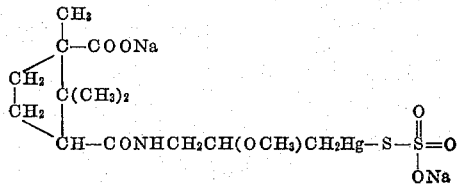

A solution may be prepared for therapeutic use by dissolving this compound in water, buffering to a suitable pH and adjusting the concentration to 40 mgm. of mercury per cc.

While the invention has been described with reference to specific embodiments, it will be apparent to those skilled in the art that various modifications may be made and equivalents substituted therefor without departing from the principles and true nature of the invention.

I claim:

1. Water-soluble sulfur-containing organic mercury compounds having diuretic properties and conforming to the general formula

wherein Y is a residue of a water-soluble organic compound with a molecular weight below 1000, R is selected from the group consisting of hydrogen and alkyl radicals containing not more than six carbon atoms, and X is a residue of an inorganic thiosulfate, and is attached to the rest of the molecule through linkage of the divalent sulfur atom of said residue with the mercury atom.

2. Water-soluble sulfur-containing organic mercury compounds as defined in claim 1, wherein Y is a residue of a water-soluble carbamyl compound and is attached to the rest of the molecule by linkage through an amide nitrogen atom.

3. Water-soluble sulfur-containing organic mercury compounds as defined in claim 1, wherein Y is a residue of a water-soluble salt of camphoramic acid and is attached to the rest of the molecule through the amide nitrogen atom.

4. Water-soluble sulfur-containing organic mercury compounds having diuretic properties and conforming to the general formula

wherein Y is a residue of a water-soluble organic compound with a molecular weight below 1000 selected from the group consisting of the saturated and unsaturated straight and branch chain hydrocarbons, the saturated and unsaturated carbocycles, the saturated and unsaturated nitrogen, oxygen and sulfur heterocycles of not over four rings and the carbon, hydrogen, oxygen, nitrogen and sulfur-bearing substitution products of the aforesaid hydrocarbons, carbocycles and heterocycles; R is a substituent selected from the group consisting of hydrogen and alkyl radicals containing not more than six carbon atoms, and X is a residue of an inorganic thiosulfate, and is attached to the rest of the molecule through linkage of the divalent sulfur atom of said residue with the mercury atom.

5. The compound having the formula

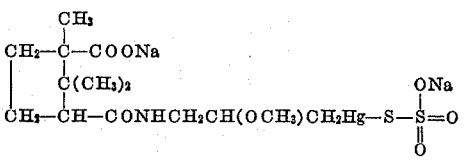

6. The process of producing sulfur-containing organic mercury compounds having diuretic properties and having the general formula

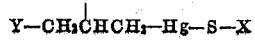

which comprises causing a compound having the formula $$Y-CH_2\overset{OR}{\underset{|}{C}}HCH_2-Hg-OH$$

to react with a sulfur-containing compound having the formula Q—S—X, Y, R and X having the meanings defined in claim 1 and Q being selected from the group consisting of hydrogen, ammonium, alkyl substituted ammonium or a metal forming a water soluble salt.

7. Water-soluble sulfur-containing organic mercury compounds as defined in claim 1 wherein Y is a residue of a water-soluble carbocyclic organic compound.

8. Water-soluble sulfur-containing organic mercury compounds as defined in claim 1 wherein Y is a residue of a water-soluble heterocyclic organic compound.

9. Water-soluble sulfur-containing organic mercury compounds as defined in claim 1 wherein Y is a residue of a water-soluble cyclo-paraffin compound.

10. Water-soluble sulfur-containing organic mercury compounds as defined in claim 1 wherein Y is a residue of a water-soluble benzene derivative.

11. Water-soluble sulfur-containing organic mercury compounds as defined in claim 1 wherein Y is a residue of a water-soluble acyclic compound.

12. Water-soluble sulfur-containing organic mercury compounds as defined in claim 1 wherein Y is a residue of a water-soluble heterocyclic sulfur compound.

13. Water-soluble sulfur-containing organic mercury compounds as defined in claim 1 wherein Y is a residue of a water-soluble heterocyclic nitrogen compound.

14. Water-soluble sulfur-containing organic mercury compounds as defined in claim 1 wherein Y is a residue of a water-soluble heterocyclic oxygen compound.

References Cited in the file of this patent

Lehman et al., Science, vol 113, April 13, 1951, pages 410–412.